Figure 5:
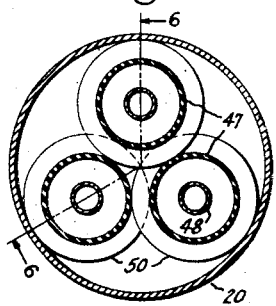

Sept. 19, 1939.　　　H. M. HOBART　　　2,173,717
ELECTRICAL SYSTEM OF POWER TRANSMISSION
Filed June 21, 1938　　　3 Sheets-Sheet 1
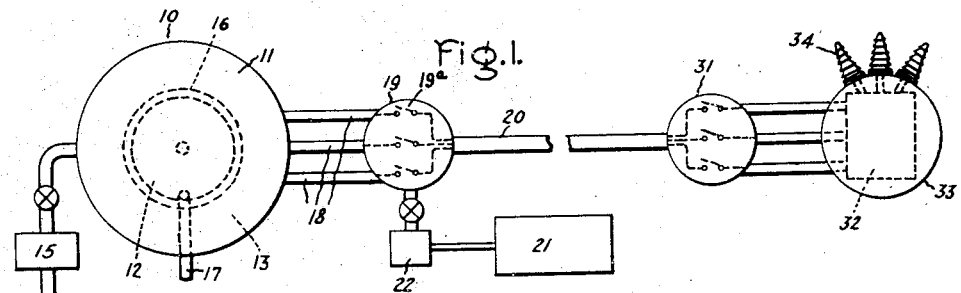
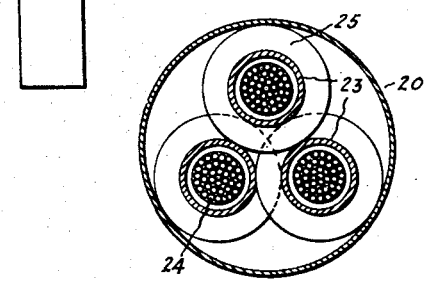
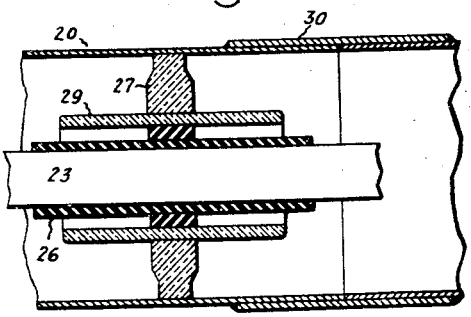
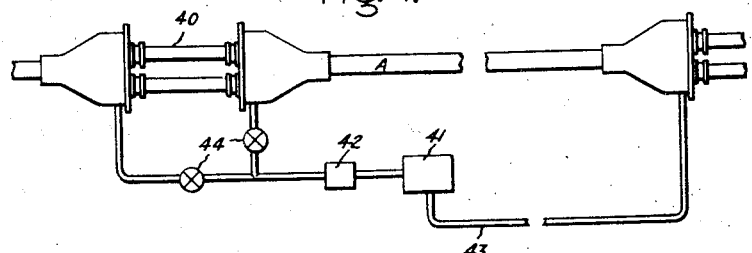
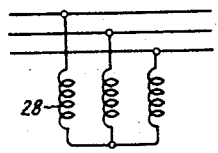
INVENTOR
Henry M. Hobart,
BY　Harry E. Dunham
ATTORNEYS Sept. 19, 1939.   H. M. HOBART   2,173,717

ELECTRICAL SYSTEM OF POWER TRANSMISSION

Filed June 21, 1938    3 Sheets-Sheet 2

INVENTOR
Henry M. Hobart,
BY Harry E. Dunham
ATTORNEYS

Patented Sept. 19, 1939

2,173,717

UNITED STATES PATENT OFFICE 2,173,717

ELECTRICAL SYSTEM OF POWER TRANSMISSION

Henry M. Hobart, Niskayuna, N. Y., assignor to General Electric Company, a corporation of New York Application June 21, 1938, Serial No. 215,002

6 Claims. (Cl. 171—97)

The present invention is a continuation in part of my application of Letters Patent Serial No. 122,593 filed January 27, 1937.

In order to transmit high voltage electric power over long distances, it is the established practice, and has been for a great many years, to use bare conductors supported by strings of insulators from metal towers. A recent and prominent example of such a system is found in the 270 mile transmission line from Boulder Dam to Los Angeles. The system is of the three phase type and is designed to transmit 240,000 kw. The conductors which are bare and of large diameter to prevent corona are supported with a lateral separation from one another, of some 30 to 40 ft., this great separation being necessary because of the enormous voltage between the conductors and because air at atmospheric pressure has a dielectric strength of only 80 volts per mil, being a relatively poor insulator. The steel towers, which are from 100 to 150 ft. in height, support long strings of suspension type insulators, and the conductor is suspended just below the lowest insulator in each string. There are 5 to 7 towers per mile, the span being some 800 to 1000 ft. For this expensive and ungainly structure, there is required a right-of-way with a width of 50 to 100 ft., and the outlay for way-leaves is considerable. Owing to the above-mentioned great distance required laterally between any two conductors, the line has a high inherent inductive voltage drop when transmitting its rated load, and in order to compensate for this drop and improve the operating stability, it is necessary to provide large over-excited synchronous condensers which are expensive and which require expensive transformers to step down the 287,000 volts of the overhead line to the 13,000 volts for which the synchronous condensers are wound. Notwithstanding the enormously expensive line construction and the expensive transformers and synchronous condensers and oil circuit breakers, the apparatus is generally regarded as still inadequate to thoroughly ensure stability. Consequently, the electric generators supplying the 240,000 kw. of electricity to the transmission line were built some 50% larger than would otherwise be necessary simply in order to decrease their inductance so that they will not still further detract from the system stability. An additional source of expense is the provision for lightning protection, and the necessity of making the entire structure strong enough to withstand the weights of ice and sleet which accumulate on the conductors and to resist the force of wind.

For transmitting electric power at high but appreciably lower voltages than those mentioned above and for relatively short distances, underground cables have been employed which may be divided into three classes as follows: (a) those having a lead sheath and a filling of thin degasified oil for impregnating the paper insulation on the conductors with external means for maintaining the oil under a low pressure of the order of 15 to 25 pounds to prevent void formation within the confines of the sheath, (b) those having paper insulated conductors enclosed in a lead sheath located within a steel pipe, said pipe being subjected internally to a gas or liquid pressure of the order of 200 lbs. per square inch so as indirectly to compress the insulation on the conductor through the medium of the lead sheath and thereby to prevent void formation, and (c) those having paper insulated conductors located within a steel pipe, the latter being filled with oil under pressure of the order of 150 lbs. per square inch which acts directly on the paper insulation to prevent void formation.

The object of my invention is the provision of an improved system of generating and transmitting electric power over long distances at voltages as for example of the order of those now involved in overhead transmission lines without the drawbacks incident thereto to the end that less investment and lower operating costs will be incurred up to the place or places from which the electric current is distributed to the ultimate consumer.

An important and distinguishing characteristic of my invention is that when it is used for larger powers and greater distances of transmission than have been possible by any cable systems employed up to the present, the voltage may be greatly increased above any which has heretofore been practicable and with an attendant decrease in the cost per kilowatt mile to values heretofore never remotely approached, thus enabling heretofore unavailable distant sources of power to be economically utilized.

For a consideration of what I believe to be novel and my invention, attention is directed to the accompanying description and the claims appended thereto.

Briefly stated, in carrying out my invention in the most effective way, the parts subjected to high voltage, such as the windings of the machines or transformers in which the high-voltage current is generated, and the switches, cables, step-down transformers, etc., are enclosed by metallic casing means suitably adapted as to shape, size, and strength for the purpose. Instead of insulating the electrical conducting parts by the means in common use for the purpose, such as impregnated paper and textile materials applied directly to the conductors either with or without a body of oil, or depending upon atmospheric air with its low dielectric strength and exposure to aqueous humidity and dirt, as in the case of overhead transmission lines, the various conducting parts are left bare and, for insulating purposes, are subjected to an aqueously-dry, clean gas under super-atmospheric pressures which may be of the order of several hundred pounds per square inch. For this purpose, there are available various gases which may be used either alone or in combination with other gases and either dry or containing an appropriate non-aqueous vapor such as $CF_2Cl_2$. Desirably the gas should be of such a character that its dielectric strength progressively increases as the pressure increases. As an example but not as a limitation of my invention, I may use dry, clean nitrogen gas or carbon dioxide and I may have mixtures of these gases. Also they may contain vapors of other materials such as $CF_2Cl_2$ which have been shown to greatly increase the dielectric strength of the combination. The value of a gaseous medium as a dielectric for a considerable increase of pressure increases substantially as the pressure is increased. Above 100 pounds per square inch, its dielectric value increases less rapidly. At 600 pounds per square inch, the value of a suitable gaseous medium as a dielectric is of the order of 2000 to 3500 root-mean-square volts per mil, varying greatly with the composition and condition of dryness and cleanliness of the gas, the spacing between conductors and between conductors and pipe, the radii of curvature of opposed conducting surfaces, the kind of current, alternating or direct, and, if direct, the polarity conditions, and whether or not the gas is circulated.

Taking as an example a case for which these conditions correspond to a dielectric strength of 3000 root-mean-square volts per mil, then if it is required to provide a factor of safety of 3, the gaseous dielectric may, in continuous service be subjected to a stress of 1000 volts per mil. But solid insulating materials such as paper, when employed in the thicknesses required for high voltage cables, cannot at 60 cycles, be continuously subjected in service for a satisfactorily long term of years, to a dielectric stress of more than some 120 rms. volts per mil at atmospheric pressure. With so-called "solid-filled" paper cables the usual permitted stress at atmospheric pressure is some 60 rms. volts per mil. In the kind of cable previously mentioned herein, as class (a), the rms. stress usually employed in service is 120 volts per mil. Although as yet there is but little service experience with the classes designated above as (b) and (c), a reasonable value to be considered as limiting would be 200 volts per mil in continuous service. At the present time, the complexity of the entire subject and the dearth of knowledge is still great. This will be the more apparent if we examine it more closely. Indeed a close examination of many details cannot be avoided in this application, if the legal requirement as to clearness and completeness of a patent specification is met. There is, for example, a general belief held by underground high voltage cable engineers to the effect that the dielectric strength of solid insulation such as paper, to resist surges or impulses, is not increased by the use of pressure as employed in classes (b) and (c), beyond its dielectric strength at one atmosphere. It is believed to be only its 60-cycle sinusoidal dielectric strength which increases with the pressure.

According to this general belief, although the 60-cycle dielectric strength of "solid-filled" paper insulation as used in cable manufacture, is considerably increased by—say— subjection to a pressure of 10 atmospheres, as, for example, to twice or perhaps even three times its corresponding strength at 1 atmosphere, for classes (b) and (c), its impulse strength at 10 atmospheres remains about the same as at 1 atmosphere. It is a generally held opinion that most failures in such cables are caused by impulses or surges. Furthermore, while there are various devices which are employed to protect the cable from being subjected to impulse stresses, it is generally admitted that none of these devices provide complete immunity from the entrance of impulses into the cable on occasions such as switching operations, lightning, short-circuit disturbances, etc., in transmission systems.

Moreover the dielectric loss in any solid materials employed for cable insulation increases as the square of the stress in volts per mil and consequently when the stress is increased, the cable heating also is increased and the life of the cable is thereby shortened. In oil filled paper cables the voltage gradient ordinarily employed corresponds to a dielectric loss of some 8% of the $I^2R$ loss in the copper conductors. But in gaseous insulation there is no dielectric loss and consequently in a compressed gas cable, higher temperatures in service will not shorten the life and may be permitted. Also, by recent tests, it has been determined that the dielectric strength of compressed gas, as distinguished from solid dielectrics, for resisting momentary high voltages such as impulses or surges, is increased with increasing gas pressure to much the same extent as its dielectric strength for resisting sinusoidal voltages. This particular consequence of the properties of compressed gases as a dielectric is of enormous importance.

For a clear understanding of my invention it is important to include in the considerations thereof, the properties of high vacuum systems in order to understand why compressed gases are employed by applicant.

Attention is especially called to the fundamental differences between the dielectric characteristics of gases and solids, for the reason that, even now, they are only in the course of being realized and co-ordinated, and because it is only a very few years since there was even far greater ignorance of the subject. Indeed, up to very recently, a large body of highly experienced transformer designers were of the opinion that the impulse strength of gasses as distinguished from solid dielectrics under pressure from surrounding gases, was no greater at a pressure of many atmospheres than at atmospheric pressure and that as a consequence it was futile to consider employing compressed gas in transformers in place of oil, because of the alleged superior effectiveness of oil to withstand impulse stresses, as compared with the effectiveness of compressed gas. While available impulse test results are still limited to pressures of only some 10 atmospheres or thereabouts, recent tests at two separate and thoroughly reliable research laboratories have independently shown the impulse strengths, while erratic in some respects, as are also the sinusoidal strengths, follow the same trends and increase in amounts to the same general extents as the dielectric strengths to resist sinusoidal voltages through the same pressure range. It has to be admitted that even at the present time, it cannot yet be said that the dielectric properties of gases at various pressures are well known, though many people are assuming this to be the case. Consequently in the interests of avoiding misunderstandings it is necessary that in this specification, a good deal of detail should be set forth.

When it comes to taking direct-current into the considerations, the conflict of opinion is still greater. A couple of years ago, a statement by Delon was published in a technical paper presented at a conference of specialists in Paris, that with direct current, "solid-filled" paper cable could be worked in continuous service at a crest stress of 900 volts per mil with a factor of safety of 3. This corresponds to a root-mean-square stress of 630 volts per mil. This statement was met by several experienced cable specialists in America, with repeated very emphatic assertions that it was preposterous; but the results of elaborate tests since made in an American laboratory have indicated that 700 crest volts per mil (500 rms. volts per mil) in service would be as conservative for a brand of "solid filled" cable manufactured in America when employed on direct current continuous service as 70 root-mean-square volts per mil is with 60 cycles. This gives a rms. stress ratio of 7 to 1. Thus Delon's cables would only need to be 25 per cent superior to these American cables to justify the Delon statement. The variations from year to year in the relative progress of the art of cable manufacture in various countries are well known to go by waves, different countries successively taking and losing the leadership, and such a 25% difference is so small in a matter of this sort that it is reasonable to expect it. The retorts made in America, a couple of years ago, prior to the above mentioned laboratory tests, to Delon's figure of 900 crest volts per mil for continuous service with direct current, were to the effect that even 350 crest volts per mil would be so high a figure as to be doubtful or even impossible of achievement and not even worthy of being discussed.

At first the thought naturally occurs that if solid material will stand many times more volts per mil on direct current than on 60 cycles, why is there enough advantage in compressed gas as compared with solid material, say "solid-filled" paper coverings, to justify the use of compressed gas with direct current transmission? The answer is that although there is less advantages than that which can be expected for 60 cycle service, the advantage of compressed gas remains very considerable. As to the volts per mil of dielectric strength of gases for direct current stresses, the crest strength in volts per mil is, in a general way, 41% (i. e. $\sqrt{2}-1$) greater than the 600 lbs. per square inch rms. values, already suggested for 60 cycles. The latter values were rounded out, for purposes of simplifying a reasonable examination, as amounting (on the basis of a safety factor of 3) to the rough typical value of a service stress of 1000 root-mean-square volts per mil, which, in direct current application, is equivalent to a direct current service stress of $$1000 \times \sqrt{2} = 1400 \text{ volts per mil}$$

as against the 700 volts per mil which tests have shown to be a safe service voltage stress for very high voltage direct current applications with American paper cables of the 1936 vintage.

So with direct current as employed for very high voltages there is still an advantage of 2:1 for gas versus solid insulation as regards the respective dielectric stresses which can be permitted in continuous service. Furthermore with gas the joints required are simpler and cheaper and more reliable for direct current high voltage conditions than we can provide with paper cable. Another reason is the great cost of the quality of paper required as compared with the cost of gas. Also the use of gas avoids hydrostatic head pressures incident to liquid insulations and hence expensive stop-joints are unnecessary. The last mentioned advantages also apply to alternating current cables embodying my invention.

For these and other reasons the compressed gas proposition is decidedly superior to the use of solid insulation even in a high voltage direct current system. It must not be overlooked that when direct current is used instead of alternating current, the cost base comes down to a far lower investment cost per kilowatt-mile, but nevertheless the lowest cost with solid insulation is considerably greater than with compressed gas, even in the case of the relatively low costs of direct current transmission at high voltage.

High voltage transmission systems have been proposed in which there is to be maintained in a pipe line an extremely high vacuum and it has been asserted that such systems have superior advantages. Thus it is stated by Van de Graff in his Patent 2,024,957 that when the pressure of air is reduced down to that of one one-hundred-thousandth of a millimeter of mercury, then, if the positive electrode is a 1.57" diameter cylindrical conductor located axially in a tube of 17.7" internal diameter which constitutes the negative electrode, the voltage gradients will be sufficiently low for ensuring safe direct current operation with 5 million volts between conductor and tube. This works out at a voltage gradient of 2500 volts per mil at the surface of the positive conductor and 230 volts per mil at the surface of the negative conductor which is the enclosing tube. It is further stated that the tubular container or negative electrode must be non-porous and free from internal projections and rough spots as otherwise the local voltage gradients will be too great. Such a system of 13,000 miles length and for the transmission of 1 million kilowatts by direct current has been estimated by Van de Graff. In such a system, vacuum pumps would be installed at intervals. The exposed surfaces of all materials within the casing require the application of "outgassing" treatment to remove residual gases.

In another direct current high voltage system proposed by Milliken in his Patent 1,764,273 he states he has determined that by special treatment of the conductor and of the walls of a conduit surrounding it but spaced therefrom, and by the production of an extreme vacuum within the conduit, it becomes practicable to transmit electricity at enormous voltages without any substantial leakage or breakdown. Milliken further states that he has made a careful investigation of the voltages that can be maintained across extremely high vacua and has determined that it is not sufficient merely to produce an extremely high vacuum, but that the electrode surfaces and the inner surfaces of the walls of the vessel in which the vacuum is produced must be subjected to careful special treatment. It is stated that this treatment involves heating such electrodes and vessel walls to high temperatures while the evacuation is proceeding, and continuing this treatment for a considerable length of time. After the surfaces of the electrodes or conductors and the vacuum vessel walls have been subjected to such heat treatment they may again be exposed to the air for several hours or days without losing the benefit of the treatment. Such treatments are unnecessary in my improved system.

Applicant is not aware that systems of the type proposed by Milliken and Van de Graff ever have been built for commercial or other use. It appears obvious to applicant that both the investment cost and the servicing cost would be prohibitive. It should be pointed out that in high vacuum electronic devices, such for example, as mercury pool rectifiers, no satisfactory knowledge is yet available for explaining or completely preventing "arc-backs." Their occurrence is erratic and is a serious hindrance to the wide use and reliability of such devices.

There are also erratic and as yet not well understood occurrences in some highly compressed gases, such as dips in the curves representing increased dielectric strength with increased pressure, but they can be experimentally determined and allowed for.

If the pressure be gradually increased from some very high vacuum to high compression, measuring throughout the range the dielectric strength of the gas, there is first a decrease from high dielectric strength down to quite low dielectric strength and this is followed by an increase which is at first rapid and which then gradually becomes moderate. Such curves are greatly different for various gases. The point of minimum dielectric strength occurs for different gases at different gas pressures, and usually at pressures much below atmospheric. Applicant has been able to find in the literature of the subject, but little useful quantitative data of the dielectric characteristics of gases at high vacua. About all that has been ascertained is that the dielectric strength is usually extremely high if the vacuum is extremely good. It is well to be reminded that the reasonable pressure of 40 atmospheres which is typical of applicant's invention, is a 3 billion times greater pressure than that used in the conduits of the proposed systems of Van de Graff and Milliken. The same gas at these two extremes of pressure may have enormously different physical characteristics; indeed it may be impracticable with some gases to go up to the higher pressure without employing high temperature, to maintain the gaseous state, while in still other gases, the critical pressure will have been reached or exceeded and at present there is insufficient knowledge of the dielectric characteristics of gases in the neighborhood of that condition, to permit of its consideration.

Figure 12:
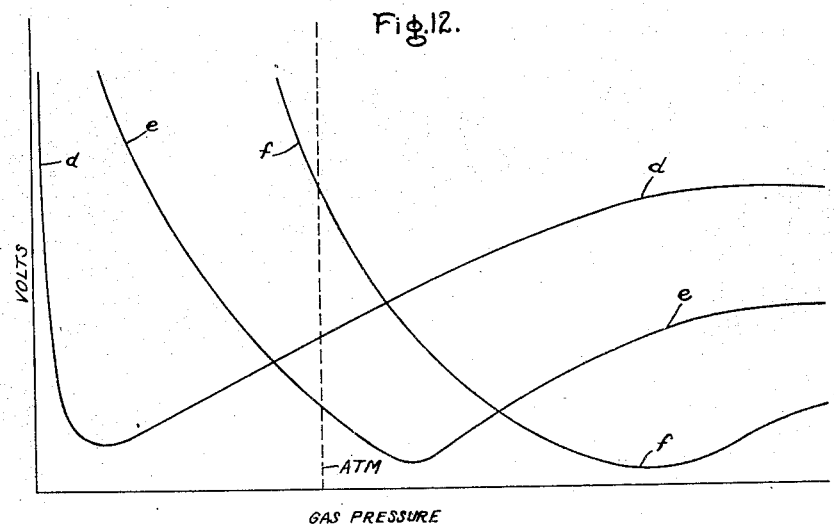

In this connection it is relevant to draw attention to Fig. 12 in which are drawn hypothetical curves $d$, $e$, and $f$. These represent respectively, curves with dielectric strength as ordinates and gas pressure as abscissae for three gases which from the standpoint of their dielectric strength at high compression may be termed ($d$) good, ($e$) medium and ($f$) poor. At the vacuum branch, it is seen that they have changed places, the best becoming the worst, etc. It will be seen that curve ($f$), the worst at the high pressure end, rises to high values of dielectric strength at vacuums which are decidedly cheaper to provide than the vacuum required for curve ($d$) to obtain equally high dielectric strength. These are merely trends which applicant has detected by perusal of the literature of gaseous dielectrics. A group of curves for several gases in which this trend may be seen, is given in Fig. 13, in which sparking volts for flat electrodes form the ordinates and gas pressures the abscissae. The plotted curves are for sulphur dioxide ($SO_2$), hydrogen ($H_2$) and helium (He). These curves indicate only very low pressures but their trend is very noticeable. In each curve there is a region where the sparking voltage is low and the vacuum reasonably good. An improvement in the vacuum such as is usually obtainable only with laboratory apparatus very rapidly increases the spark-over voltage. Unfortunately, as is well understood, such vacuums as are required can only be obtained at the expense of a great deal of more or less delicate apparatus and would be prohibitive for long stretches of cable for reasons indicated herein.

There is one advantage of using high vacuum, namely that the thickness of the pipe need not be great since there is only the matter of about one atmosphere difference of pressure to be maintained. But this is far out-weighed by the fact that the metal walls contain within their mass large quantities of occluded gas, varying with the particular gas, with the material of the wall and of the enclosures, and with the temperature, and that no effective means has been developed for the prevention of this occlusion. The gas may be driven out but will gradually return. It goes gradually from the pipe walls into the interior and impairs the vacuum and thus affects the dielectric strength. It is one thing to perform an experiment with individual pieces of apparatus in a laboratory and quite another matter to maintain the desired condition throughout hundreds of miles of underground steel pipe line. As illustrating this point the vacuum required in mercury pool rectifiers which has required years of research and extremely high workmanship and skill to be made practicable, is 0.0002 millimeter of mercury, whereas Van de Graff states that for providing the dielectric strength required in his system he needs a vacuum of 0.00001 which is one-twentieth of the density used in the mercury pool rectifiers.

It is only recently and since applicant made his invention that with compressed gas insulation it has come to be admitted that the former claim that tests had shown that the impulse strength does not increase with the gas pressure, is wrong, and that it does increase, and at substantially the same rate as the 60 cycle strength to withstand sinusoidal voltage stresses. Applicant is unaware of any reliable knowledge of the corresponding characteristics of high vacua as regards the dielectric strength to resist impulse voltages although diligent search has been made therefor.

Another great inferiority of employing a high vacuum instead of a highly compressed gas resides in the fact that a high vacuum is about the best known impediment to heat transfer whereas a gas at high pressure is very effective in transferring heat from the conductor to the casing.

In steel tank mercury pool rectifiers, which employ a vacuum only 1/20 as good as Van de Graff states to be required in his vacuum transmission system, it has taken several tens of years of patient research by men of great skill to learn how to make the relatively small tanks sufficiently gas tight to serve their purposes reliably. Many kinds of seals were tried at joints. In a long distance vacuum transmission system there will be innumerable joints required, pin hole leaks will develop and analogous defects will occur. A single one of these incidents will occasion a major interruption and nothing less than a miracle can make an economic success of such a system at the present state of human knowledge. This should be contrasted with a compressed gas system in which any trifling loss of pressure due to gas leakage will be automatically compensated, by the admission of make-up gas from the source of supply.

It is definitely known that the gain in dielectric strength of gases with increasing pressure is enormous and continues to increase with increasing pressure but at a rate which is lower the higher the pressure. Consequently, having due regard to the strength of the casing means required for the electrical parts, a pressure of the order of 600 lbs. per square inch and above may be taken as a suitable pressure for the purpose hereof but not as a limitation of my invention. Whatever gas is used, it desirably has high heat conductivity and consequently for some ratings a gas of inferior dielectric strength, such as hydrogen, or a suitable mixture of hydrogen and carbon dioxide may be used. Hydrogen has a much higher power for transmitting heat away from the conductor than other gases, but when it is employed, a higher gas pressure should be used to provide the desired dielectric strength. However, the heat transfer conditions in the enclosed high pressure system with bare conductors of this invention, is so very much superior to the corresponding conditions in hitherto available systems with solid insulation on the conductors, that the chief considerations are the provision of high dielectric strength; the thermal conditions in all but very extreme cases being much more favorable than necessary.

The uninsulated or bare conductors, whether they be in the generator, transformers, switches, cables, or other parts, are mechanically supported within the metal casing means by suitable spaced solid insulators to hold them in spaced relation to the casing walls. Such supports or insulators may be small because unlike those used in the present overhead transmission lines, they are subjected over their exposed surfaces to dried and high presure gas which prevents flashovers or crepage of the high voltage current over said surfaces. By the terms uninsulated or bare conductors is meant conductors which have no covering whatsoever or which have a covering which is so thin as to be wholly incapable of withstanding the very high voltages to which the conductors are subjected.

Figure 6:
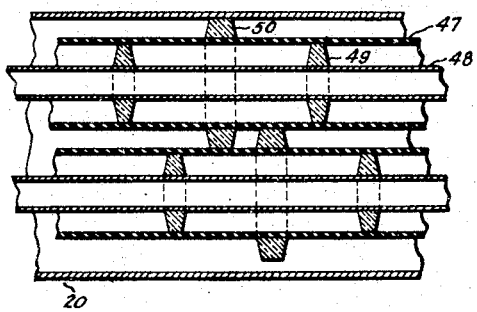
Figure 8:
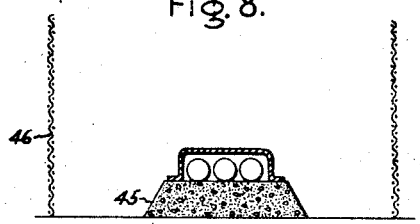
Figure 9:
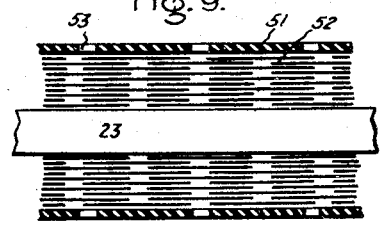
Figure 10:
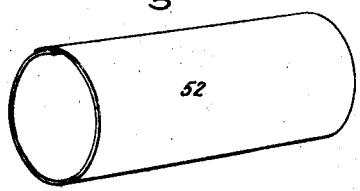
Figure 11:
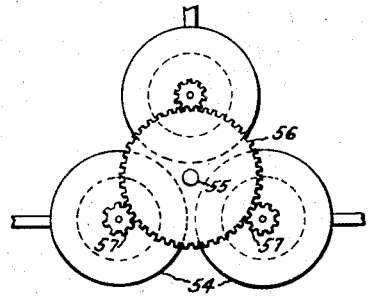
Figure 13:
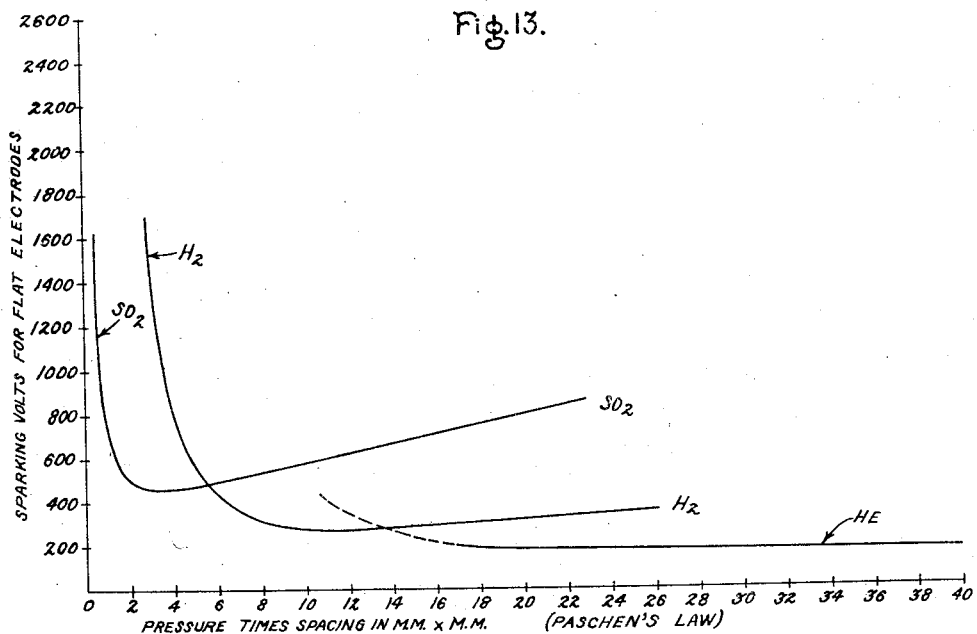

In the accompanying drawings which are illustrative of my invention, Fig. 1 illustrates diagrammatically a long distance, three phase, high tension electrical power transmission system; Fig. 2 is a sectional view of a three-conductor cable; Fig. 3 is a sectional view of a single conductor cable; Fig. 4 is a diagrammatic view of means for circulating and cooling the high pressure gas; Fig. 5 is a cross-sectional view of a three-conductor cable; Fig. 6 is a longitudinal section of the cable shown in Fig. 5 taken on the line 6—6; Fig. 7 is a diagrammatic view of an inductance connected to the conductors; Fig. 8 shows a suitable mounting for the transmission conductors; Fig. 9 illustrates an arrangement for dividing the insulating gas into thin layers; Fig. 10 is a perspective view of one of the partitions used in Fig. 9; Fig. 11 is a diagrammatic view of an arrangement for driving the generators at a higher speed than that of the prime mover, and Figs. 12 and 13 are curves illustrative of certain gases under various conditions of pressure.

In Fig. 1, 10 indicates an electric generator comprising a stator 11 and a rotating field magnet 12, the latter being rotated at the desired speed by a prime mover either directly or indirectly. As a general proposition, it is desirable to make the generator as small as possible consistent with the work it is to perform and for that reason the rotor of the generator desirably may have a higher shaft speed than that of the prime mover. Because of the difficulties in making a generator capable of delivering current at 287,000 volts and upwards, it is in some instances desirable when, for example, the transmission system is over 40,000 volts, to use a low voltage generator of ordinary construction (say not over 20,000 volts) and step up to the transmission voltage in a compressed gas transformer. When a step-up transformer is used the transformer alone will employ compressed gas for insulation, the low voltage generator desirably being insulated in the ways customary at present. Also in cases where a high periodicity of at least 300 cycles per second is employed, the cost and weight of step-up transformers is so small that it is uneconomical to provide the high voltage in the generator. So in such cases, the generator winding will not be insulated by enclosure in compressed gas, but will through low voltage bushings enter the enclosing tank of a compressed gas transformer.

All of the windings of the generator wound directly for high voltage may be located in a chamber supplied by high pressure gas or only the stator winding. Due to the size and shape of the parts of the generator, it may in some cases be desirable to use a lower gas pressure in the generator than that in the long steel pipes containing the transmission conductors. 13 indicates a chamber containing the uninsulated stator windings which is filled with gas at a lower pressure than that used in the cables and which may be of the order of 200 pounds per square inch, said gas constituting the insulating medium. Gas under the determined pressure is supplied to the chamber 13 from a supply tank 14 by means of a suitable compressor 15. Where it is also desired to have the rotor revolve in an atmosphere of gas, say hydrogen for example, it is enclosed in a casing 16, the outer or division wall of which is common to the stator casing and to which gas at the desired pressure is delivered in a manner similar to that above described, by the pipe 17. Although it is not always desirable to have the rotor in a chamber containing gas at a substantial pressure, such an arrangement has the material advantage of reducing the effective pressure on the division wall to the extent that one gas pressure tends to balance the other. A generator whose rotor runs in hydrogen at 10 atmospheres would have about the same total friction loss, bearings plus gas friction, as one running in air at normal pressure, and the pressure of 10 atmospheres exterior to the stator casing walls would permit of thinner walls for the casing inside of which, for example, the pressure is maintained at 15 atmospheres.

The conductors carrying current from the stator winding to the distribution system are contained in pipes of steel or other material 18 defining chambers and capable of withstanding high pressure. The chambers of the pipes and the conductors therein contained are desirably subjected to the same high gas pressure as the pipes containing the transmission conductors but may contain gas at the lower pressure of the stator casing, if such lower pressure is used therein. The said pipes and their conductors enter the thick walled chambered casing 19 containing suitable switches 19a capable of conveying current from the generator to the transmission cables and interrupting the circuit when desired. Gas under the desired pressure of the system, which, for example, may be of the order of 600 to 750 pounds per square inch, is delivered to the casing where it acts on the conducting parts therein contained from a supply tank or combined tank and accumulator 21 by means of a suitable compressor 22. The use of compressed gas as an insulator for the conducting parts will permit of a substantial reduction in the size of the compressed gas switches in the casing 19. The three conductors desirably pass from the switching means into a single pipe 20 where they are symmetrically arranged as shown in Fig. 2. In order to reduce corona effect, the conductors 23 of copper or other suitable material are made of rather large diameter and hollow to reduce weight. As an alternative the copper tubes may be welded or brazed to form a long conduit into which a stranded cable 24 may be pulled later, when all the rest is completed. With such an alternative very long single lengths of conductors from reels may be used with a corresponding reduction in the number of joints. Threaded on each tubular conductor are numerous ring shaped elements 25 made of insulating material and forming mechanical supports therefor. The supports are spaced at suitable intervals so as to hold the conductors in their proper positions with respect to each other and to the inner wall of the enclosing steel pipe 20. Each insulating support is of such outer diameter that it engages the inner wall of the pipe and rests on and is supported by two other conductors.

In the event that three separate pipes are employed with a single conductor in each, the arrangement shown in Fig. 3 may be employed where 23 indicates the conductor which may be solid or tubular and around which is a thin tubular covering 26 of insulation extendng for a short distance thereon and tightly swaged or ironed in place. Surrounding the conductors are insulators 27 of glass, porcelain, or synthetic resin, each of disk-shaped form, the periphery of which engages the adjacent wall of the pipe 20. The insulators should not tightly fit the wall because it is necessary to form a passage or passages to permit gas freely to pass longitudinally through the pipe. The means of supporting the conductor described above may also be regarded as typical of the means employed to support the stator windings in the core slots of the generator or the windings of the transformers, the metal pipe corresponding in this particular to the laminated core of the stator and of the transformers. If desired, the creepage surface of the insulator may be increased by inserting a tube 29 of insulating material such as porcelain in the insulator, said tube having an axial length appreciably greater than the hub or central part of the insulator proper. Whether one or three conductors are arranged in the same pipe, the insulators will first be threaded on the conductors, after which the conductors are drawn into the pipes. Since the pipes have to be made in relatively short lengths and the lengths united by welding or equivalent means, except at certain special points where other forms of union are employed, the conductors may also be made in relatively short lengths and substantially longer than the pipe lengths. The conductors if sufficiently flexible may be supplied on reels in which case the joints will be fewer in number, but it will be more troublesome to thread the insulators thereon. My invention imposes no restriction in this particular. A suitable way to unite the pipe lengths is to surround the adjacent ends thereof with a slightly larger pipe or sleeve 30 and weld it to the pipe lengths. As the pipes are installed and united, the conductor or conductors will likewise be united in any suitable manner to form a continuous conductor or conductors. In general, it may be stated that the diameter of each conductor joint preferably should conform closely to the diameter of the conductor itself and should in any case be smooth to decrease corona effects.

Assuming the case of a transmission system of 287,000 volts with a phase voltage of 165,000 volts, the conductor surface need not be separated from the internal wall of the pipe by a radial distance of more than approximately 1500 mils, using for the purpose a pipe having an internal diameter of about four inches. The thickness of the wall to withstand the internal pressure will depend, of course, on the material employed in the pipe and said pressure. For the above mentioned phase voltage of 165,000 volts and a radial spacing of 1500 mils from the conductor surface to the inner wall of the casing, the dielectric stress will be 110 volts per mil. Some solid insulating materials will sustain such stresses successfully in continuous service, but would require care in the selection and testing of the product and a lower stress would be desirable and would permit of employing cheaper material. But the cost of the enclosing steel pipe is a large item in the total cost of an underground system of this kind, and, for a given internal gas pressure, the weight and cost of the steel pipe for a given factor of safety, increases as the square of the diameter, since the total pressure is directly proportional to the diameter, thus requiring an increase in wall thickness as well as an increase in the diameter. So instead of improving the design by an increase in the pipe diameter in order to decrease the volts per mil in the solid insulation, it will usually be preferable to maintain the pipe diameter very small and employ for the insulating support, some type designed to obtain the desired low value for the volts per mil, by employing a predominatingly longitudinal path for the stress in the dielectric. Several insulating supports in the design of which this desirable feature is embodied, are the subjects of patent applications of mine now pending and, by their use, the stress in the solid insulation may be reduced to any desired extent, say to 30 volts per mil. The importance of this feature increases with the phase voltage. Since the compressed gas system has an increasing advantage over present systems the higher the transmission voltage, and since the underlying economic principles of long distance power transmission call for higher voltage the greater the transmission distance and the greater the amount of power transmitted, it is reasonable to expect that we shall in a few years be employing 60 cycle transmission systems for half a million volts and over, provided sound technical means are employed. The system of my invention makes these means available as regards both the pipe lines and the step-up and step-down transformers in the case of 60 cycles alternating current. For direct current, the conditions are much less severe, particularly inasmuch as with direct current, solid insulations will withstand greater dielectric stresses per mil of thickness and, furthermore, there is no dielectric hysteresis loss with direct current.

The transmission conductors in the pipe or pipes 20 extend to the place or places where current is to be supplied to the consumer. Since my invention is especially directed to long distance transmission, these pipes may extend for a distance of one hundred miles or more. Because of the high voltage involved, it is desirable to provide switching means for the conductors at or near the place where the current is to be utilized. For this purpose, switch means located in a casing 31 are provided which may be of the same character as the switch means 18a in casing 19 previously referred to. From the switch means, the conductors enter a transformer 32 contained in a strong walled casing 33 which is similarly filled with a compressed gas for insulating purposes. In the transformer, the windings are or may be supported in the manner as illustrated in Fig. 3 or in some other manner better adapted to the special conditions in a transformer, and the voltage is stepped down from that of the line to say 33,000 volts or less with the result that the insulating terminals or bushings 34 may be of simple design such as are in common use. This is in contrast to the very large and expensive terminal bushings which would otherwise be required if subjected to the full transmission line voltage.

Reference has been made to increasing the transmission line voltage above that of the generator. A step-up transformer of the same general character as that illustrated at 32 would in such a case be used and desirably located at or near the generator. Such a transformer would be connected to the pipe lines, and terminal bushings would not be required.

In long lines, the conductors must be of liberal cross-section to keep down the percentage IR drop. But in shorter lines, where the IR drop will in any case not be great, it may be desirable to economize copper by employing smaller cross-section and higher current density. In that case, it may be desirable to circulate the gas within the system either in whole or in part for the purpose of cooling it. A suitable arrangement for this purpose applied to the case where the transmission line is sectionalized into two-mile lengths is indicated in Fig. 4 wherein A represents such a two-mile length. The connection between two adjacent two-mile sections, each of which constitutes a separate gas tank of relatively great cubical capacity, may be made by providing enlargements at the ends of the two-mile sections. There are obviously various possible constructions. In the one employed in the example, three thick walled glass tubes 40 contain the conductors in their passage from one tank to the next, and they enter the tank through high pressure glands. To provide room for the tubes and their packings, it is necessary to enlarge the diameter of the tank at the end where the glass tubes emerge. 41 indicates a cooler of any suitable construction, and 42 a gas circulating pump. The cooler and pump are connected to opposite ends of the tank by suitable pipes 43 of small diameter. Each tank may have its own cooler and pump or two or more tanks may be connected thereto, suitable controlling valves 44 being provided. Because the gas is at high pressure and the pipes at ground potential, no trouble will be experienced in arranging the gas circulating and cooling system.

Instead of supporting the transmission pipe lines on elevated and expensive towers, they are located near the ground and clamped on suitable low supports 45 as in Fig. 8 which may be of concrete or other material. No supporting insulators are required because the pipes are at ground potential, and hence there is no danger to life. As a right of way will generally be required, its boundaries may be defined by strong wire fences 46 of usual construction. In some places in order to best meet the conditions, the pipes may be buried in the ground, or they may be partly underground and partly above it in the same system. In any event, the right of way required will be much narrower than that required for overhead transmission with their widely spaced conductors. Furthermore, the conductors are well protected from external injury, and the matter of storms of snow and sleet and lightning and wind is of no importance. In territory subject to seismic disturbances, suitable simple and obvious elastic or expansion constructions will be employed. Catenary constructions at a very small height above the ground will be useful in some terrains.

An important fundamental advantage of my improved system resides in the fact that throughout their entire length the conductors are normally within one or two inches of grounded metal parts which results in the inductance being very small indeed. While these small spacings between conductors and from each conductor to ground, increase the capacitance of the system, this increase is far less than with solid insulated conductors because the dielectric constant of gases is unity as against much higher values for paper insulation. This is precisely the opposite state of affairs from the very high inductance of the widely separated conductors of a high tension overhead system. When it is desirable to neutralize the moderate charging current occasioned by the capacitance of this system, it may be done by suitable inductances distributed at appropriate places in the line and preferably connected between each conductor and ground as indicated at 28, Fig. 7, each inductance being constructed for three phase and with star connection. These inductances will be enclosed in casings containing a high pressure insulating gas, the casings being in communication with the pipe line through short connecting pipes.

With oil impregnated paper such as is used with underground cables of the prior art, the dielectric constant is usually between 3 and 4½, but where gas is used in the manner set forth herein, the dielectric constant will be 1 and the charging current will for a given insulation thickness be only about 0.3 as great as per mile. It will, however, be economically practicable to so increase the pipe diameter and the conductor spacings as to bring the charging current down to only 10 to 20% of what it would be for oil impregnated paper cable for the same voltage. Taking the case of 20%, then the compensating inductance will cost only ⅕ as much as would be the case if an impregnated paper cable were employed. Instead of being a prohibitive objection almost hopelessly handicapping the use of underground cables for the long distance transmission of 60 cycle electric power, which would be the state of affairs with the usual paper insulated types of cable, the cost of the compensating inductance becomes, with compressed gas insulated cables, a mere minor consideration. Indeed, these inductances will represent much less of an outlay expressed as a percentage of the total system outlay, than the synchronous condensers and their stepdown transformers used for the overhead transmission line from Boulder Dam. Furthermore, there will be cases where the reasonably small capacitance inherent to the line need not be compensated, since it will be useful to take advantage of the charging current to neutralize the lagging current of the usual loads of communities. In other words, if, as is usual, the power factor is due to an inductive load, the lagging current will tend to offset the charging current of the transmission line.

Foremost in the subdivisions of any system is that into 60 cycle polyphase alternating current transmission systems and direct current transmission systems. In the case of the direct current systems, the transmission conductors and the enclosing pipes can be much simpler and cheaper than for 60 cycle systems without introducing losses or objectionable features, and furthermore, the cost for compensating devices is eliminated. In general, it may be stated that for direct current the transmission line itself costs a matter of half as much as for a 60 cycle transmission line for the same amount of load and distance. A 60 cycle compressed gas transmission line in turn, may, in the case of large powers, cost considerably less per kw. mile than a 60 cycle overhead line adequate for the same power and distance.

In Figs. 5 and 6 is shown a modification of the conductor structure wherein 20 indicates a steel or equivalent pipe. Inside of it are three longitudinally extending tubes 47 made preferably of insulating material and supported in their respective positions by widely spaced insulators 50. Each insulator engages the inner wall of the pipe and also two of the tubes 47. Inside of each insulating tube is a bare metal tube 48 which forms the conductor or a support for a stranded conductor located therein as shown in Fig. 2, in which case the parts are in electrical contact throughout their respective lengths. The metal tubes 48 are concentrically supported within the tubes 47 by disk-like insulators 49. The tubes 47 are in turn supported in place by the ring type insulators 50. The tubes 47 are filled with gas under high pressures, of the order of 600 pounds per square inch, for example, to effectively insulate the conductor therein. The entire space between the inside tubes and the wall of the outside pipe 20 is also filled with gas. This gas may advantageously be at a lower pressure, as 450 pounds per square inch, thereby subjecting the walls of the inside tubes to the relatively lower pressure difference corresponding to the internal pressure of 600 pounds and the external pressure of 450 pounds. This is particularly desirable when the inner tubes are of insulating material. By this arrangement, the walls of the insulating tubes will be subjected to the difference of pressure on opposite sides thereof and hence the effective pressure tending to rupture them will be correspondingly reduced. Because air is cheap, it may be compressed in suitable compressors and used to fill the spaces in the pipe outside of the insulating tubes since extremely high dielectric strength is less imperative in these outer spaces. For systems with extremely high voltage—say from half a million volts, upwards, Fig. 6 illustrates the particularly valuable feature of interposing between any two conductors and between any conductor and the steel pipe, a total length of solid dielectric in which the two radial components provided by 49 and 50, may be supplemented to any desired extent by the longitudinal component provided by 47. Due to the large spacing between the conductors and also to the very considerable distance from the conductors to the internal surface of the steel tube, the capacitance between conductors and between conductors and ground is extremely low and the charging current per mile will be so small expressed as a percentage of the working current, that in many cases it may not be necessary or desirable to compensate for the charging current by inserting inductances of such value as to provide in such inductances a lagging current of the same amount as the leading charging current. It will generally be desirable to have the capacitance predominate, and it will be useful in offsetting the lagging power factor of such loads as induction motors, transformers when unloaded, induction furnaces and other contrivances with low and lagging power factor.

Since thin layers of gaseous insulation have a much greater dielectric strength in volts per mil than thicker ones, I may, where the voltages involved are especially high, use the construction illustrated in Figs. 9 and 10 wherein 23 indicates the conductor and 51 an enclosing insulating tube. Surrounding the conductor and located inside of the tube are perforated tubes, barriers, or partitions 52 of thin insulating material such as paper impregnated with a suitable compound such as hardened phenolic condensation product to make them self-supporting. These tubes may be of relatively short length and have overlapping joints. The doubled thickness at this joint serves as a spacer to provide the thin layers of gaseous insulation between successive concentric tubes and to permit them to be opened to pass around the conductor and then to snap shut with an overlapping joint. Such an arrangement also affords means to permit the gas in the successive layers to be in free communication. To permit the gas within the enclosing steel pipe, such as 20, to freely circulate through the spaces between the paper tubes, tubes 51 are perforated as indicated at 53. As a result of this arrangement, the pressure within and outside of the tubes 51 is the same. Since these concentric paper cylinders tend to impede the transfer of heat from the conductor to the outer steel pipe, it becomes important to offset this thermal disadvantage by employing a large percentage of hydrogen in the compressed gas medium as hydrogen is thermally greatly superior to other gases, although its dielectric strength is less. But its inherent dielectric weakness may be compensated by the thin film construction and by employing a high degree of compression of the gas.

As previously indicated, it is sometimes desirable to use relatively small generators and to drive them at a speed substantially above that of the prime mover. Such an arrangement is shown in Fig. 11 wherein 54 indicates generators either of the direct or alternating current type. 55 indicates the shaft of a prime mover of any suitable character such as a turbine, for example. On the shaft is mounted a spur gear 56 which drives pinions 57 mounted on the respective shafts of the generators. The generators may be enclosed in casings to which insulating gas is admitted under pressure in the same manner as indicated in connection with Fig. 1.

The customary type of underground cable using impregnated paper as the insulating material, if more than a few miles in length, presents the objectionable feature of great capacitance and in the case of overhead transmission system the objectionable feature resides in its great inductance. In my improved system, the above objections are wholly or largely overcome. The use of high pressure gas has the advantage of insulating the high voltage conductors from the steel pipe and moreover it has the dielectric constant of 1 where as when impregnated paper is used as the insulating medium, the dielectric constant is of the order of 3 to 4½. Thus the use of highly compressed gas decreases the charging current per mile to some 25 to 33% of what it would be if paper were employed. It is possible to improve this by increasing the spacing between the conductors. This means, of course, an increased diameter of pipe which may or may not be justified from a cost standpoint.

The use of high compression for the gas not only improves its dielectric strength, which is the main purpose of the high pressure, but it is also to be noted that the transfer of heat from the conductor by convection increases as the square root of the pressure and thus constitutes a further very important reason for using highly compressed gas as the insulating medium.

What I claim as new and desire to secure by Letters Patent of the United States, is:

1. A system of distribution for high voltage electric currents comprising an apparatus for generating high voltage current, conductors receiving current from the apparatus and conveying it to a distant point of utilization, a completely sealed chambered metallic casing means capable of withstanding high pressures in which the conductors are located and maintaned out of contact with the walls thereof and out of contact with each other, solid insulating supports for the conductors within the casing means of such shapes and proportions that the stress throughout the material shall not exceed its dielectric capability in service, a filling of gas of high heat conductivity for the chamber of the casing for transmitting heat from the conduits to the wall of the casing means, and means for supplying such gas to the chamber and maintaining it about the conductors and their supports under sufficiently high super-atmospheric pressure to prevent the escape of current from the high voltage conductors to the metal wall of the casing or from one conductor to another under voltage stresses of whatever kind.

2. A system of distribution for high voltage electric currents comprising an apparatus for generating high voltage current, a completely sealed chambered metallic casing therefor capable of withstanding high internal pressure, solid insulating means for mechanically holding the high voltage winding out of contact with the walls of the casing, the insulating means being so shaped and dimensioned that the electrical stress throughout the mass thereof shall not in any portion exceed its dielectric strength capability, bare conductors receiving current from the high voltage winding and conveying it to a distant point for utilization, a completely sealed chambered metallic casing means capable of withstanding high internal pressures in which the conductors are located and extending longitudinally thereof, the means being in communication with the chambered casing, solid insulating means in the casing means for mechanically holding the conductors out of contact with the walls thereof, the solid insulating means being so shaped and dimentioned as not to be electrically stressed in any part of the solid mass beyond its dielectric capability, fillings of insulating high heat conducting gas for both of the chambers, and means for supplying gas to the chambers under high super-atmospheric pressure to prevent the escape of current from the high voltage winding and from the conductors to the walls of the casing.

3. A system of distribution for high voltage electric current comprising an apparatus for generating high voltage current, a metallic chambered casing enclosing the generator, a step-down transformer, a metallic chambered casing enclosing the transformer, conductors for conveying current from the high voltage generator to the transformer, metal pipes enclosing the conductors and defining chambers, fillings of high heat conducting gas for the chambers in which the conducting parts are located, terminals for the low voltage side of the transformer supported by the casing thereof, and means for maintaining gas within the chambers under a pressure of the order of several hundred pounds per square inch to ensure insulation and protection of the current conducting parts of the system from the metallic walls of the casing.

4. A system for the economical distribution of large amounts of electrical power over great distances which comprises an apparatus for generating high voltage and heavy current, parallel conductors, receiving current from the generator, magnetic pipe means in which the conductors are supported out of electrical contact with the wall thereof, the arrangement being such that the inductance effect is small, said means being divided into sections, elongated tank means connecting the ends of adjacent sections forming additional storage space for gas and through which the conductors extend, and a filling of aqueously dry clean gas under several hundred pounds pressure for the pipe means and the tank means, said gas having high dielectric strength and high heat conductivity and serving effectively to insulate and protect the conductors from each other.

5. A system of distribution for very high voltage currents over long distances which comprises an apparatus for generating large amounts of current at moderate voltage, a step-up transformer receiving current from the generator, bare transmission conductors, a step-down transformer receiving current from the transmission conductors, a switch means, metallic casing means for each of the aforesaid parts, pipe means containing the conductors and through which gas flows between the casing means, and a means for maintaining a body of aqueously dry clean insulating gas in the casing and pipe means under a pressure of several hundred pounds effectively to insulate the current carrying parts from the metal walls of the casing means.

6. A system for the economical transmission of large amounts of electrical power over great distances comprising an apparatus for generating a large amount of current at relatively high voltage, a casing for the generator, means for supplying insulating gas to the casing under a relatively low pressure for insulating and protecting the generator, a step-up transformer receiving current from the generator, a casing for the transformer containing insulating gas under a determined pressure, bare conductors receiving current from the transformer and conveying it to a point of utilization, metallic pipe means adapted to withstand high internal pressure in which the conductors are located, solid insulators in spaced relation supporting the conductors inside of the pipe means, out of contact with each other and the wall of the pipe means, and a filling of dry insulating gas for the pipe means maintained under a pressure substantially higher than that filling the casings of the generator and of the transformer.

HENRY M. HOBART.